E. WRIGLEY.
MACHINE FOR SPLITTING AND SPLAYING THE ENDS OF METAL BARS.
APPLICATION FILED JULY 10, 1907.

901,667.

Patented Oct. 20, 1908.

WITNESSES:

INVENTOR,
EDWARD WRIGLEY,
BY
ATTORNEYS.

UNITED STATES PATENT OFFICE.

EDWARD WRIGLEY, OF AUCKLAND, NEW ZEALAND.

MACHINE FOR SPLITTING AND SPLAYING THE ENDS OF METAL BARS.

No. 901,667.  Specification of Letters Patent.  Patented Oct. 20, 1908.

Application filed July 10, 1907. Serial No. 383,106.

*To all whom it may concern:*

Be it known that I, EDWARD WRIGLEY, a subject of the King of Great Britain, residing at Auckland, in the Colony of New Zealand, have invented a new and useful Machine for Splitting and Splaying the Ends of Metal Bars; and I do hereby declare the following to be a full, clear, and exact description of the same.

This invention relates to a machine for use in splitting and splaying the ends of metal bars, which bars are to be employed in ferro-concrete constructional works, or for other purposes in which the ends of metal bars require to be split and splayed out to provide for an increased anchorage or holding surface.

The machine devised comprises a power shaft, to which rotatory motion is communicated by any suitable motive power. On the shaft are secured two eccentrically mounted disks or cams, each one of which is surrounded by a strap or like device. To each strap is pivoted one end of a connecting rod or lever, and the other ends of these levers are pivoted in such a manner as to be capable of radial movement upon a common fixed axis.

Attached to each lever, is a steel shear plate, and the two plates, together with the levers to which they are attached, are so disposed that the adjacent faces of the shear plates shall be in close engagement with each other.

Each shear plate is recessed on its internal face, and extending outwards to its front edge, the recess formed, being so shaped as to provide a straight cutting edge extending horizontally across the surface of the plate, and for a widened mouth to the opening of the recess in the edge of the plate. The two plates are so disposed, when the levers to which they are attached, are closed to their fullest extent, that the horizontal cutting edge of one recess shall be a distance below that of the other sufficient to allow of the bar to be split, passing between the two edges, and the recesses are made of sufficient depth to allow of the insertion of the end of the bar between them.

Figure 1:
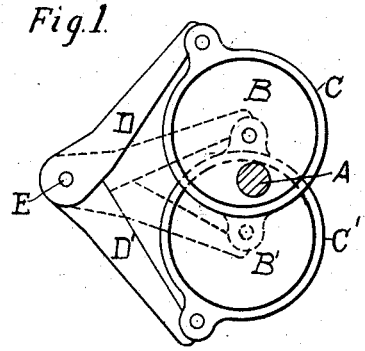
Figure 6:
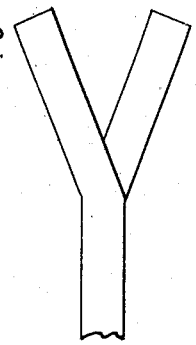
Figure 2:
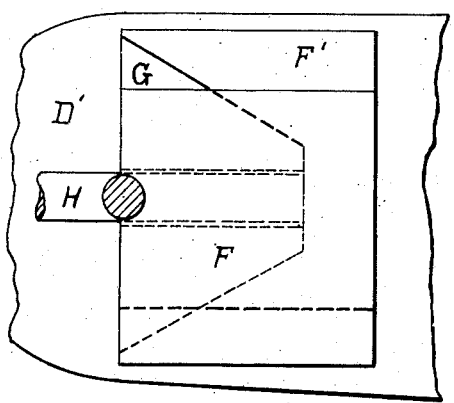
Figure 3:
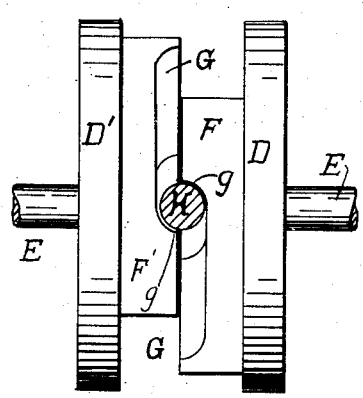
Figure 4:
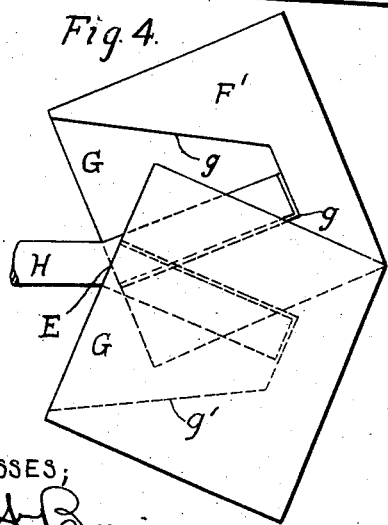
Figure 5:
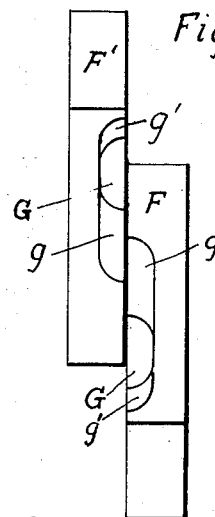

In the accompanying drawings, which illustrate the invention:—Figure 1 is a side elevation of the means devised. Fig. 2 is a side elevation, on an enlarged scale, of the two shear plates, the near lever being removed for the purpose of clearness of illustration, and the shear plates being shown in the position adapted to receive the end of the bar to be split. Fig. 3 is an end elevation thereof. Fig. 4 is a side elevation of the shear plates, showing the positions assumed towards the end of the splitting operation. Fig. 5 is an end elevation of the same. Fig. 6 is a view of an end of a bar split in the manner desired.

A, is the operating shaft that is driven by any suitable power, and on which are secured the eccentrics B, B'.

C, C' are the eccentric straps surrounding the respective eccentrics, B, B'.

D, D' are the levers that are articulated at one end to the respective straps, C, C', and at their other ends are mounted upon a common fixed axis E, so that upon the revolution of the eccentrics, these levers will be given an opening and closing movement upon the axis E, in the manner shown by dotted lines in Fig. 1.

F, F', are the shear plates that are secured upon the inside faces of the respective levers D, D' which levers are so disposed in their distance apart as to provide for the adjacent faces of the shear plates being in close contact, as shown specially in Figs. 3 and 5.

Each shear plate is formed with the depression or recess G, on its internal face, which is of the form shown in the drawings, and provides a straight cutting edge $g$ extending inwards from one edge thereof, and an inclined opposite edge $g'$ that inclines outwards to the same edge of the plate.

The two cutting edges $g$ are so disposed, that when the levers are in the closed position shown in Figs. 2 and 3, they shall lie in parallel lines, enough distance one below the other, to allow of the bar H to be split, lying between them. The recesses G, are also made of such a depth that the bar will extend for half its cross sectional area into each recess.

When the end of the bar has thus been placed between the shear plates, and the shaft A is rotated to open the levers, the two cutting edges $g$ will impinge upon the bar, one below and one above it, so that as the movement of the levers continues, the bar will be split into two halves. These halves, by reason of their engagement with the edges of the respective recesses, will then be bent apart in the manner shown in Figs. 4 and 6, the width of the splay being dependent upon the length of the bar inserted between the plates, or to the amount of movement given the levers. The wide mouths of the recesses G, will permit of the splayed ends being readily withdrawn.

Other means than the eccentrics B, B' and straps C, C', may be employed for operating the levers D, D', such for instance, as cranks fixed on the shaft A, and I do not wish to confine myself exclusively to the use of those shown in the drawings, which have been included as illustrating the preferred means of operation.

What I do claim as my invention, and desire to secure by Letters Patent, is:—

1. In means for splitting and splaying the ends of metal bars, a pair of shear plates secured upon the adjacent faces of two levers pivoted on a fixed axis, and so disposed as to keep the faces of the shear plates in close contact, means for opening and closing the levers upon their axis, and a recess formed on the internal face of each shear plate and extending inwards from the front edge thereof, such recess having a straight cutting edge adapted to lie in a parallel line with the corresponding edge of the other shear plate when the levers are closed, substantially as herein specified.

2. In means for splitting and splaying the ends of metal bars, a pair of shear plates secured upon the adjacent faces of two levers pivoted on a fixed axis, and so disposed as to keep the faces of the shear plates in close contact, a power shaft, a pair of eccentrics secured thereon, and a pair of straps surrounding the respective eccentrics, to which straps the free ends of the respective levers are articulated, and a recess formed on the internal face of each shear plate and extending inwards from the front edge thereof, such recess having a straight cutting edge adapted to lie in a parallel line with the corresponding edge of the other shear plate when the levers are closed, substantially as herein specified.

Dated this 1st day of February 1907.

In testimony whereof, I have signed this specification in the presence of two subscribing witnesses.

EDWARD WRIGLEY.

Witnesses:
  EDWARD BROOKE-SMITH,
  E. F. COURTNEY.